May 8, 1934.   H. F. SOPER ET AL   1,957,677
LIQUID CONTAINER AND HOUSING
Filed March 12, 1932
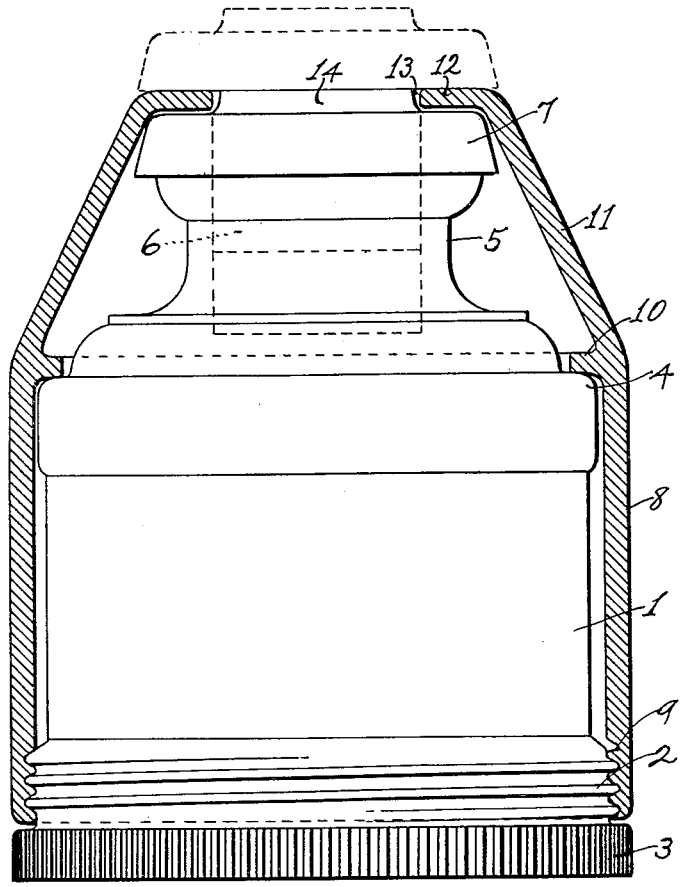
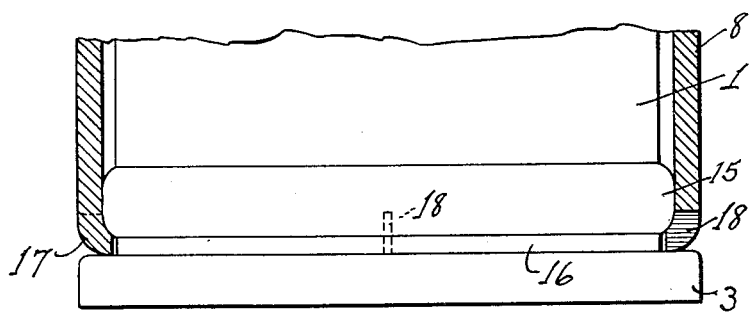
Henry F. Soper
Edgar P. Sparks
INVENTOR
BY
Gifford, Scull & Burgess
ATTORNEYS Patented May 8, 1934

1,957,677

UNITED STATES PATENT OFFICE 1,957,677

LIQUID CONTAINER AND HOUSING

Henry F. Soper, Montclair, N. J., and Edgar P. Sparks, Oakland, Calif., assignors to L. E. Waterman Company, New York, N. Y., a corporation of New York Application March 12, 1932, Serial No. 598,324

2 Claims. (Cl. 215—100)

This invention relates to a liquid container and a removable housing or casing therefor. The invention is especially useful in connection with an ink bottle, but the device is not limited to this particular use.

In carrying out this invention a container, such as an ink bottle, is made of glass, for example, and the casing or housing therefor may be made of wood, bakelite, metal or other rigid material that can be colored or ornamented in an attractive manner. The container or ink bottle and the casing are provided with inter-engaging means, such as screw threads or a snap fastener, by means of which the two can be securely assembled. The container or bottle is also provided with means to facilitate removal of the casing or housing from the container or bottle when desired.

The invention will be understood from the description in connection with the accompanying drawing in which Fig. 1 is a vertical section through an illustrative embodiment of the invention and Fig. 2 is a similar view partly broken away of a modification.

In the drawing reference character 1 indicates the container which is shown in the drawing as an ink bottle, although the invention is applicable to other containers. The bottle 1 is provided along the lower circular portion thereof with an enlargement that is screw-threaded, as indicated at 2. A flange 3 larger in diameter than the screw-threaded portion 2 is provided at the lower end of the bottle and is preferably knurled around its periphery to enable the user to hold it more securely when the casing or housing is being applied or removed. Its diameter is such that the outer surface of the flange 3 is in line with or protrudes beyond the outer surface of the casing or housing.

The bottle 1 is provided with a shoulder 4 some distance from the lower portion of the bottle and the neck 5 is provided with a stopper 6 of cork or other material. The stopper 6 has a flange 7 which rests upon the upper end of the neck 5 when the stopper is pushed in to the limit.

A casing or housing 8 is provided for the container 1. This casing or housing may be made of a variety of materials which possess the desired strength and are capable of being ornamented or colored in an attractive manner. The lower end of the casing 8 is provided with internal threads 9 to screw upon the threads 2. An annular rim or extension 10 may be provided along the inside of the casing 8 to bear upon the upper edge of the shoulder 4 when the casing is applied to the container. The upper portion 11 of the casing 8 is shown as being conical in shape and terminates in an upper end 12 which may rest upon the flange 7 of the cork 6 when the casing is in place. The end 12 is provided with an opening 13 into which a central projection 14 on the cork 7 extends preferably with the upper surface of this extension flush with the upper surface of the end 12.

In the modification shown in Fig. 2 a rib 15 with rounded edges is provided near the lower end of the container 1 and a groove 16 is provided between the rib 18 and the flange 3. In this modification the lower end of the casing 8 is turned inwardly, as indicated at 17 to form a flange to enter the groove 16. The flange 17 is slit at intervals 18 to enable this flange to snap into position in the groove 16 when the casing 8 is pushed into place.

The operation is as follows:

In the embodiment shown in Fig. 1 the casing 8 is screwed upon the bottle 1, with the cork 6 inserted as far as it will go, until the flange 10 presses firmly upon the shoulder 4. Or, when the flange 10 is omitted, the casing 8 is screwed on the container until the end 12 rests upon the cork 7 or the lower end of the casing 8 bears against the edge of the flange 3. The casing 8 can be made of a more attractive design and color than is true of the ordinary bottles or containers so that in addition to the safety against breakage and removal of the stopper which the casing supplies, the assembly possesses a more attractive appearance than the container without the casing.

The casing may be unscrewed by grasping the flange 3 in one hand and unscrewing the casing with the other hand. The stopper 6 may then be removed, the casing replaced and the stopper inserted through the opening 13 a sufficient distance to close the bottle, as indicated in dotted lines in Fig. 1 so that the bottle can be opened and used without removing the casing.

In the modification shown in Fig. 2 the casing is pressed downwardly to cause the flange 17 to snap into the groove 16 instead of screwing the casing into place. In this modification the casing can be removed simply by pressing downwardly upon the extension 14 of the stopper or upon the end of the neck 5 of the bottle when the stopper is not in place while holding the casing in such a position as to have the flange 3 elevated slightly.

We claim:

1. In combination a container and a housing for said container, the lower portion of said housing being adapted to be removably connected to the lower portion of said container, the upper ends of said housing and container being provided with aligned openings, and a stopper for said container having a flange larger in diameter than the opening in said housing.

2. In combination, a container and a housing for said container, the lower portion of said housing being adapted to be removably connected to the lower portion of said container, a flange along the inner side of said housing, and a shoulder on said container against which said flange presses, said container having a neck above said shoulder and said housing having a reduced portion surrounding said neck.

HENRY F. SOPER.
EDGAR P. SPARKS.